(12) United States Patent
Kelkar et al.

(10) Patent No.: US 6,947,507 B2
(45) Date of Patent: Sep. 20, 2005

(54) SPATIAL-TEMPORAL METHODS AND SYSTEMS FOR RECEPTION OF NON-LINE-OF-SIGHT COMMUNICATION SIGNALS

(75) Inventors: Kris Kelkar, Camarillo, CA (US); Anand Kelkar, Calabasas, CA (US)

(73) Assignee: Calamp Corp., Oxnard, CA (US)

(*) Notice: Subject to any disclaimer, the term of this patent is extended or adjusted under 35 U.S.C. 154(b) by 746 days.

(21) Appl. No.: 09/989,337

(22) Filed: Nov. 20, 2001

(65) Prior Publication Data

US 2002/0064246 A1 May 30, 2002

Related U.S. Application Data

(60) Provisional application No. 60/253,602, filed on Nov. 27, 2000.

(51) Int. Cl.[7] .............................. H04L 1/02; H04L 27/14
(52) U.S. Cl. .......................................... 375/347; 375/316
(58) Field of Search ................................ 375/347, 348, 375/139, 147, 316; 324/614

(56) References Cited

U.S. PATENT DOCUMENTS

| | | | |
|---|---|---|---|
| 5,642,353 A | 6/1997 | Roy | |
| 5,982,327 A | 11/1999 | Vook | |
| 6,141,392 A | * 10/2000 | Hoshikuki et al. | 375/347 |
| 6,141,567 A | 10/2000 | Youssefmir | |
| 6,151,487 A | * 11/2000 | Kim et al. | 455/134 |
| 6,177,906 B1 | 1/2001 | Petrus | |
| 6,370,357 B1 | * 4/2002 | Xiao et al. | 455/67.11 |
| 6,731,953 B1 | * 5/2004 | McGowan et al. | 455/561 |

OTHER PUBLICATIONS

Liberti, Joseph, et al., Smart Antennas for Wireless Communication, Prentice Hall, Upper Saddle River, New Jersey, 1999, pp. 95–101.

* cited by examiner

*Primary Examiner*—Khai Tran
(74) *Attorney, Agent, or Firm*—Koppel, Jacobs, Patrick & Heybl

(57) ABSTRACT

Receiver systems and methods are provided for processing transmit signals $S_{tr}$ that are received over a receive channel $C_{rcv}$ which is formed by a plurality of receive paths. Method embodiments comprise the steps of a) receiving the transmit signals $S_{tr}$ with a plurality of spatially separated antennas to form respective receive signals $S_{rcv}$, and b) spatially and temporally processing the receive signals $S_{rcv}$ to form a combined corrected signal $S_{crct_{cmb}}$ that reduces errors in at least one signal parameter. Exemplary signal parameters include signal preambles, codes, spreading codes and modulations.

31 Claims, 5 Drawing Sheets

SPATIAL-TEMPORAL METHODS AND SYSTEMS FOR RECEPTION OF NON-LINE-OF-SIGHT COMMUNICATION SIGNALS

CROSS REFERENCES TO RELATED APPLICATIONS

This application claims the benefit of U.S. Provisional Application Ser. No. 60/253,602 filed Nov. 27, 2000.

BACKGROUND OF THE INVENTION

In point-to-multipoint (PMP) communications, there is an inherent asymmetry in the tolerance of costs for hub and customer premise equipment (CPE). There is a desire to reduce the cost of CPE, even if it increases the cost of hub equipment.

Communication systems have encountered problems in the presence of high multipath and scattering, and high path loss due to obstructions, shadowing and absorbtion. Multipath is the phenomenon where signals, though transmitted from a single point can appear at the receive point as multiple delayed versions superimposed on themselves, where generally, the received signal energy appears to emanate from various spatial locations due to reflections and scattering of signals.

There are many causes for this behavior, called "multipath". When there is a physical blockage in the line-of-sight path between the transmit antenna and the receive antenna, the only signals available at the receive antenna are those subjected to the multipath condition. Additionally, due to scattering of signals in the transmission path, signals can find multiple paths from the transmitter to the intended receiver. Finally, in such a transmission environment, signals transmitted from a source can find their way to non-intended receivers, thus interfering with their reception of desired signals. Path loss in free space is well understood. However, in non-line-of-sight environments, terrain, obstructions that shadow or absorb signals, and destructive interference from multipath can cause substantially higher path loss.

In PMP systems, the classical approach has been to use single carrier signals modulated with BPSK, QPSK N-ary PSK or QAM modulation formats. The classical approach to receiving such single carrier signals is to use a decision feedback equalizer. This device attempts to equalize the channel by estimating the channel and subtracting out the estimated multipath energy. Specifically, such an equalizer implements an algorithms similar to the following to estimate the transmitted signal, based on the received signal:

$$T=(R-(A_2 Rz^{-1}+A_3 Rz^{-2} \_\_\_ A_n Rz^{-n}))/A_1$$

Where T=estimate of transmitted signal
R=received signal
$A_1$–$A_n$=estimate of channel in the form of an FIR filter
$z^{-n}$=delay element where n represents the number of delay states This approach can lead to substantial performance degradation in noisy or, high multi-path environments. Also, the classical decision feedback equalizer requires a long time to converge on a good estimate of the channel in noisy and high multipath environments.

Later approaches involved utilizing spread spectrum techniques in which the data signal is spread by multiplying it with a higher rate spreading sequence, where delayed versions of the spreading sequences are highly uncorrelated to the original spreading sequence. Using this property, spread spectrum signals are received by using multiple correlators, called a Rake Receiver, wherein the signal and its multipath elements can be isolated and independently demodulated.

This technique is effective if the multipath delay spread (time delay between the earliest and latest received path for a given transmission) is less than 10% of the symbol time of the modulated data signal. This holds true for wireless systems transmitting low data rate signals, but not for ones transmitting high data rate signals. If the delay spread is significantly greater than 10% of the symbol time, then equalizers must be used—resulting in the same issues as equalizers for reception of single carrier transmissions.

Recently, companies have been advocating the use of multi-carrier modulation schemes such as orthogonal frequency division multiplexing (OFDM), orthogonal code division multiplexing (OCDM), or multicarrier CDMA to allow the receiver to better compensate for multipath and scattering encountered in the transmission channel. The basic concept is to divide the high data rate signal into multiple lower data rate signals and to transmit each low data rate signal using a different frequency tone (in the case of OFDM), or code (in the case of OCDM or multicarrier CDMA).

The techniques developed to receive these modulation formats allow them to work in high multipath environments with nominal degradation in performance. For example, a properly designed OFDM system may have its useable performance degraded by 2–4 dB in the presence of high multipath, where the same measure of performance in conventional equalizer-receivers using single carrier approaches may degrade by substantially larger amounts, if they are able to receive the signal at all.

However, the multi-carrier modulation schemes inherently have a high peak to average power ratio. This ratio requires increased linearity in non-linear components such as transmit upconverters and power amplifiers. This increased linearity is achieved by a combination of backoff (operating the amplifier at a lower power where it operates more linearly) and linearization (where non-linearities are compensated for through pre-distortion or feed-forward inter-modulation cancellation). Both these linearization techniques add a great deal of cost to the amplifier and therefore are considered undesirable in CPE.

Various modulation techniques have been developed to combat multipath. However, few techniques have been developed to overcome the higher path loss associated with non-line-of-sight transmissions.

SUMMARY OF THE INVENTION

The present invention is directed to spatial-temporal methods and systems for reception of non-line-of-sight communication signals. In particular, the invention is directed to methods of processing transmit signals $S_{tr}$ that are received over a receive channel $C_{rcv}$ which is formed by a plurality of receive paths.

A method embodiment comprises the steps of a) receiving the transmit signals $S_{tr}$ with a plurality of spatially separated antennas to form respective receive signals $S_{rcv}$ and b) spatially and temporally processing the receive signals $S_{rcv}$ to form a combined corrected signal $S_{crct_{cmb}}$ that reduces errors in at least one signal parameter. Another method embodiment adds the step of c) reducing interference signals in the combined corrected signal $S_{crct_{cmb}}$.

Exemplary signal parameters include signal preambles, codes, spreading codes and modulations.

Method embodiments also include the steps of d) coherently downconverting and digitizing the received signals $S_{rcv}$, and e) demodulating the combined corrected signal $S_{crctcmb}$ to recover data signals.

Communication systems that can practice the methods of the invention are also provided.

The novel features of the invention are set forth with particularity in the appended claims. The invention will be best understood from the following description when read in conjunction with the accompanying drawings.

DESCRIPTION OF THE INVENTION

The present invention is directed to communication structures that are capable of receiving burst signals in high multipath, noisy environments with a small overhead in terms of superfluous data. It is further directed to methods for adding spatial processing to temporal processing to more effectively estimate the transmitted signal, based on the received signal.

The processing approach described herein is intended for use in single carrier or multi-carrier modulation formats. Although it is expected that the invention provides some benefit to reception of multi-carrier signals, it exhibits a greater improvement in reception of single carrier signals, because the multi-carrier signal reception today supercedes the performance of single carrier signals in high multipath, noisy environments.

It is noted that single carrier waveforms with varying modulation densities (e.g. BPSK, QPSK, m-PSK, 16-QAM, 64-QAM, 256-QAM, 8-VSB) typically include a signal parameter in the form of a unique identification waveform, called a "preamble", that is generally inserted at the beginning of a data stream. The preamble is ideally a spectrally wide waveform that has a low degree of correlation with delayed versions of the same waveform. Alternatively, spread spectrum waveforms contain a unique spreading sequence that is used to modulate the data signal wherein the spreading sequence has a low degree of correlation with delayed versions of the same waveform. In this signal embodiment, the transmit signal $S_{tr}$ consists of a preamble followed by modulated data.

Figure 1:
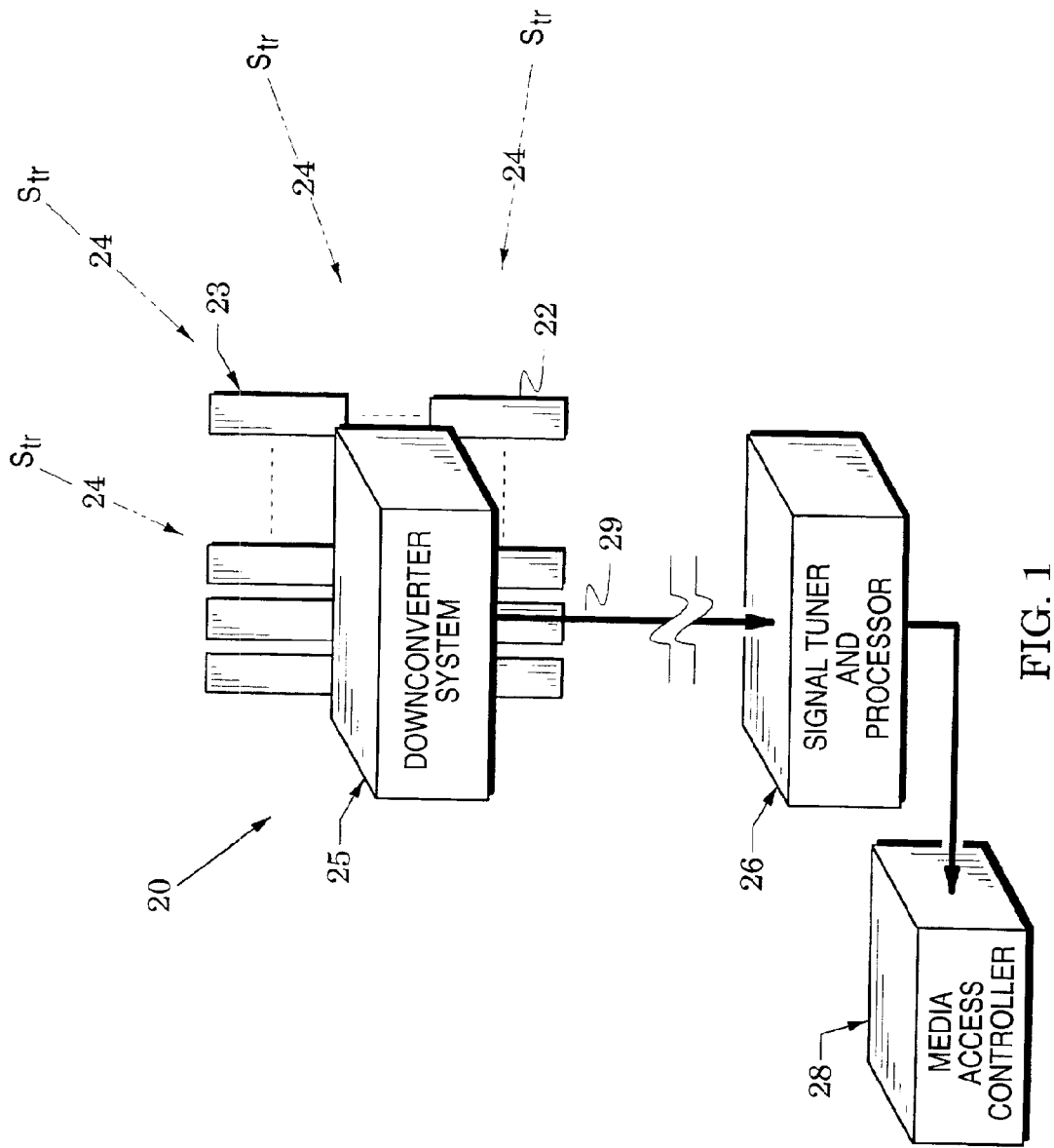
FIG. 1 is an isometric view of a receiver system of the present invention for a wireless communications system.

FIG. 1 illustrates a receiver system 20 of the present invention for a wireless modem termination system (WMTS). The receiver system includes antenna elements ("sticks") 22 which may be organized in an M×N antenna array 23. As indicated in FIG. 1, transmit signals $S_{tr}$ (i.e., CPE transmission signals) are typically scattered and arrive from several locations or, equivalently, over several receive paths 24 which together comprise a receive channel $C_{rcv}$.

The antenna elements 22 need not be constrained in any specific physical configuration to practice the communication methods of the invention. Their physical arrangement, however, does provide spatial filtering benefits that are specific to the geometric relationships of the specific application. Preferably, the antenna elements are spaced at distances of approximately the wavelength of the desired signal divided by two (the spacing may have various configurations, e.g., generally along the line of the received signals, transverse to this line and so on).

The receiver system 20 further includes a downconverter system 25, a signal tuner and processor 26 and a media access controller 28. Coherent downconverted signals are preferably passed from the downconverter system 25 to the signal tuner and processor 26 over a cable 29.

Figure 2:
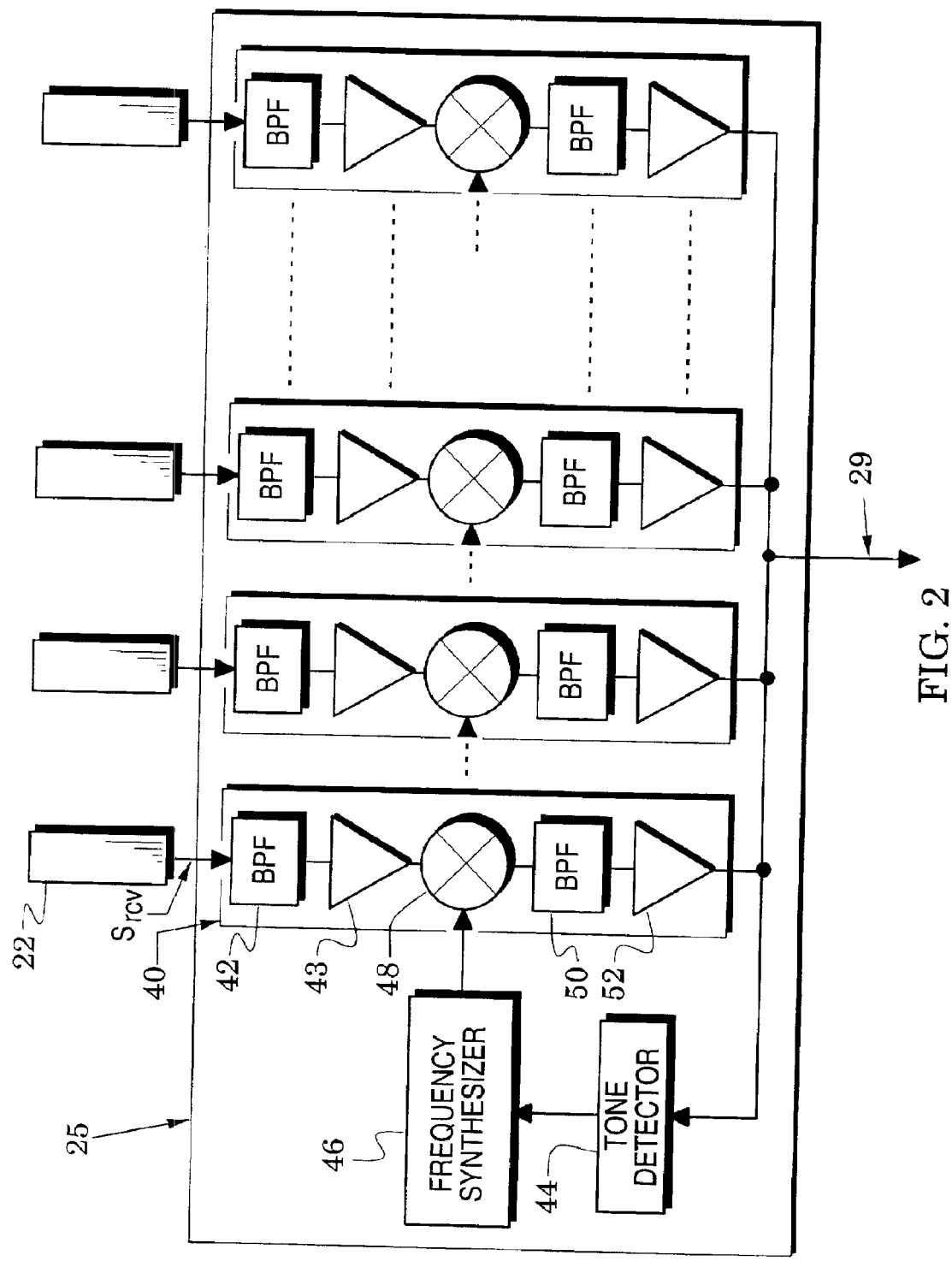
FIG. 2 is a block diagram of a coherent downconverter system in the receiver system of FIG. 1.

FIG. 2 illustrates that receive signals $S_{rcv}$ from the antenna elements 22 are converted into different frequency blocks and preferably multiplexed onto the single cable 29 by the downconverter system 25. In particular, each antenna element 22 feeds a respective low noise block downconverter (LNB) 40 which includes an initial bandpass filter (BPF) 42 and a low noise amplifier (LNA) 43. Although shown as part of respective LNBs, the initial BPFs may be directly coupled to the RF output terminal of respective antenna elements.

Downconverting reference signals are derived in response to a tone or series of tones that are preferably provided to a tone detector 44 through the cable 29 that multiplexes the downconverted receive signals $S_{rcv}$. The cable 29 also preferably carries the power (in the form of a DC voltage) that is required to power the LNBs 40. In response to the tone detector 44, a frequency synthesizer 46 generates various coherent oscillator frequencies that are locked to the reference tone(s). An exemplary frequency synthesizer is a phase locked loop implemented with conventional analog loops or digitally with numerically controlled oscillators (NCO).

The generated local oscillator signals of the frequency synthesizer 46 are fed to respective mixers 48 where they mix the signals received by the antenna elements to a lower frequency that is more suitable for transmission down the cable 29. Signals from the frequency mixers 48 are selected by BPFs 50 and amplified by amplifiers 52. The frequencies of the local oscillator signals are selected so that the coherent downconverted receive signals $S_{rcv}$ are frequency division multiplexed on the cable 29 for simultaneous transmission to the signal tuner and processor (26 in FIG. 1). It is noted that a cable transport embodiment may be an optical transport in which the cable 29 is a fiber optic cable and the downconverter system 25 has an optical transmitter at its output.

Figure 3:
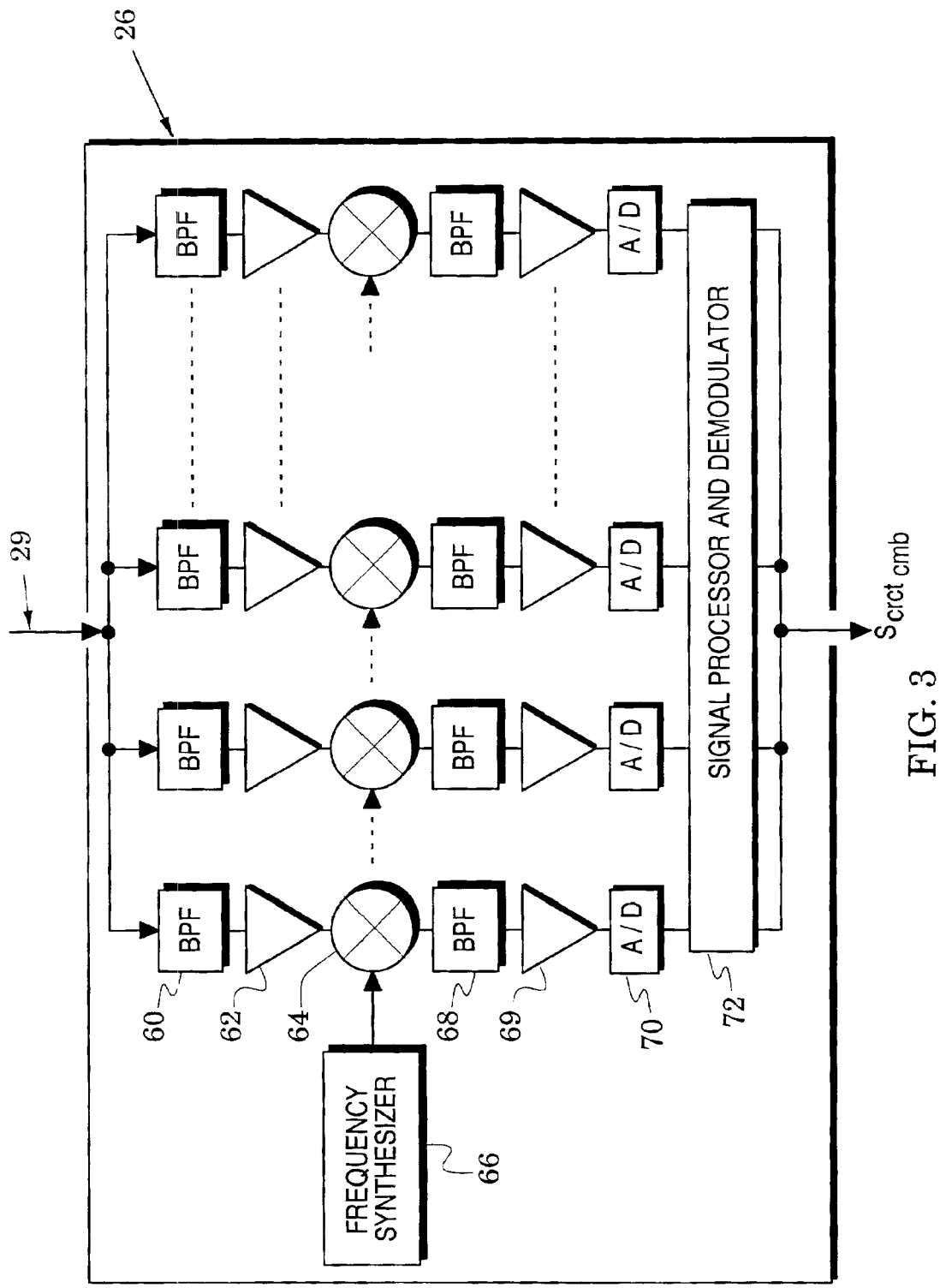
FIG. 3 is a block diagram of a coherent signal tuner and processor in the receiver system of FIG. 1.

The frequency division multiplexed receive signals $S_{rcv}$ are received from the cable 29 into the signal tuner and processor 26 of FIG. 3. After the receive signals $S_{rcv}$ are separated by appropriate BPFs 60 and amplified in amplifiers 62, they are passed to second mixers 64. In an optical transmission embodiment, the BPFs 60 would be fed by an optical demodulator. A frequency synthesizer 66 provides coherent signals to the second mixers which further downconvert the receive signals $S_{rcv}$ to known intermediate frequencies after which they are filtered, amplified and digitized in BPFs 68, amplifiers 69 and analog-to-digital converters (A/D) 70. The digitized signals are then coupled to a data processor and demodulator 72 (e.g., a digital signal processor (DSP)). Various modified embodiments of the signal tuner and processor embodiment of FIG. 3 can be used to practice the invention. For example, the sequence of the BPF 68 function and the A/D 70 operation may be interchanged.

In operation of the receiver system 20 of FIGS. 1–3, the antenna elements 22 and the downconverter system 25 are preferably positioned on a tower to enhance reception of the transmit signals $S_{tr}$. The outputs of the antenna elements are receive signals $S_{rcv}$ that are individually filtered and downconverted in the LNBs 40 and then combined in the single cable 29. The cable may be of a length sufficient to conveniently position the signal tuner and processor 26 remotely from the tower (e.g., in a base station equipment shelter).

In the signal tuner and processor 26, the receive signals $S_{rcv}$ are separated, digitized and applied to the data processor and demodulator 70 that is programmed to realize the methods of the invention which correct the receive channel $C_{rcv}$, configure the antenna beam and reduce or mitigate the contribution of interference signals to thereby provide a combined corrected signal $S_{crct_{cmb}}$ which is coupled to the media access controller 28 for further communication processing and interfacing with other portions of the WMTS.

In the data processor and demodulator 70, the digitized coherent receive signals $S_{rcv}$ are also coherently detected and sampled with conventional techniques for demodulating single carrier modulated signals (e.g., those designed for guassian channels). In an exemplary demodulator, a carrier tracking loop locks to the modulated signals and generates an estimate of the carrier phase in order to demodulate the I and Q portions of the complex waveform down to baseband. A bit timing loop samples the modulated waveform at optimal points. The received signals are preferably oversampled, in order to provide better processing resolution. Other exemplary demodulator processes employ soft bit slicing, forward error correction and interleaving (similar to those performed on the transmit side). The demodulated signals are then processed in a data processor (e.g., a digital signal processor (DSP)).

The receiver system 20 of FIGS. 1–3 facilitates methods of the invention that process transmit signals $S_{tr}$ which are received over a receive channel $C_{rcv}$ wherein the receive channel comprises a plurality of receive paths. A receive method embodiment is shown in the flow chart 80 of FIG. 4. In an initial step 82 of this embodiment, transmit signals $S_{tr}$ are received with a plurality of spatially separated antennas to form respective receive signals $S_{rcv}$. In process step 84, the receive signals $S_{rcv}$ are spatially and temporally processed to form a combined corrected signal $S_{crct_{cmb}}$ that reduces errors in at least one signal parameter (e.g., a signal preamble, code or modulation). In process step 86, interference signals in the combined corrected signal $S_{crct_{cmb}}$ are reduced. These steps effectively estimate and correct the receive channel via temporal and spatial processing.

Figure 4:
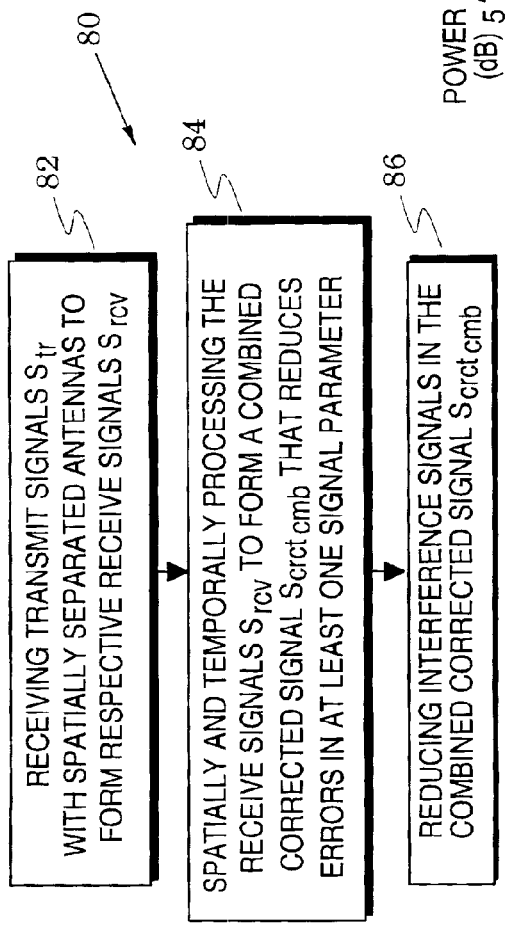
FIG. 4 is a flow chart that shows process steps in a method that is practiced with the receiver system of FIG. 1.

One embodiment of process step 84 of FIG. 4 is realized with temporal filtering that is followed by spatial filtering. A first step of this embodiment develops an accurate estimate of the channel employed to transmit the desired signal. Generally a channel is modeled as a number of delayed versions of the transmitted signal, each multiplied by a complex coefficient.

The sum of these scaled, delayed versions is degraded by the addition of random noise (generally white gaussian noise) and at least one interfering signal. A channel estimator must estimate the variable parameters necessary to correct the channel. In particular, estimate the specific delay lengths of each of the delayed paths and the complex coefficients that scale each delayed path to thereby reduce an error between a known signal parameter and a corresponding signal parameter provided by the equalized channel.

A preferred approach in estimating the channel is to utilize a correlation function, where the received waveform is convolved with the expected, known signal parameter, e.g., a preamble that precedes the transmitted data. Due to properties of the preamble, for a given relative position of the preamble and the received signal, the correlation function spreads uncorrelated energy (interference and delayed paths) and integrates (reduces) random noise with respect to the integrated, correlated or otherwise combined signal level.

This gives the correlation function the properties of estimating a delayed path that is described by the relative position of the preamble and the received signal. The accuracy of the correlation function is directly proportional to the length of the preamble. Choosing a preamble length of 64, for example, provides the ability to find delayed paths that have amplitudes which are 15–18 dB below that of the minimum detectable signal amplitude when measured on a per symbol basis.

Figure 5:
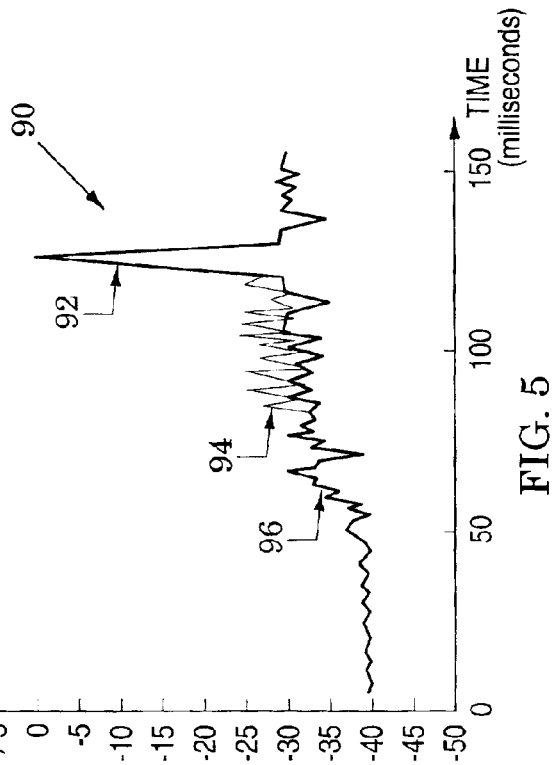
FIG. 5 is a diagram that illustrates a convolution process which facilitates the method of FIG. 4.

An exemplary convolution was performed with a 32 symbol preamble in which each symbol had 15 dB signal-to-noise ratio (SNR). The convolution results are shown in the graph 90 of FIG. 5 in which a plot 92 defines a unit-level main peak that has no delay and a plot 94 defines ten additional peaks that are reduced over 20 dB and each delayed by an additional symbol. The plot 92 also shows a residual time sidelobe level 96 which represents the delay amplitude measurement limit after the convolution.

A sample splitting method may be employed in order to more accurately estimate the exact time delay for a given delayed path. In general, given a sufficient signal to noise ratio, each delay estimate may be split, effectively generating intermediate delay values that are more resolute than that commensurate with the samples. This allows for more accurate channel estimation and reduces computational intensity later in the process. These individual delay amplitudes are referred to as A1–An. Specifically, a single delay path will show up as multiple delay paths at multiple, adjacent time slots, if the delay time is not accurately determined.

In this embodiment of process step 84 of FIG. 4, the channel is estimated on all of the antenna elements (22 in FIG. 1). The channel estimate is then fed into an equalizer in terms of $A_1$–$A_n$ to implement a recursive process. The equalizer preferably uses non-linear delays and thus more accurately models the channel than classical linear delay equalizers. The recursive process essentially estimates the largest delayed path, based on the received signal and the equalizer algorithm. Non-linear decision filtering may be added to enhance the accuracy of the equalizer. However, if non-linear decision filtering is utilized to calculate the estimated delayed components, it is not applied to the actual estimated delay path.

After the largest delay path is estimated, subsequent delayed paths are then estimated. Finally, all of the estimated delay paths are added in phase, in order to reduce the contribution of noise and interference. The net effect is that noise and interference is integrated noncoherently. In contrast, the desired signal is coherently integrated in phase and thus its power is increased with respect to the noncoherently integrated interference and noise. An improved signal plus interference to noise ratio (SINR) is thereby provided.

The results of each of the equalized antenna inputs is then fed into an antenna beam forming algorithm. The beamforming algorithm generates estimates $B_1$–$B_m$ wherein the following formula provides the best estimate of the known, desired preamble:

$$D = B_1 ER_1 + B_2 ER_2 + \ldots + B_m ER_m$$

in which D is a desired signal, $B_1$–$B_m$ are complex coefficients that factor each equalized antenna input in order to form the beam and $ER_1$–$ER_m$ are signals received from each of m antennas wherein these signals have been processed by the equalizer described above.

An exemplary optimization approach is the method of least square error. This method involves developing a cost function defined as the square of the error between the estimated received preamble and the actual known preamble. This error is then summed over the entire preamble and is minimized through differential calculus based on generating partial derivatives with respect to each of the coefficients $B_1$–$B_m$. This process yields a multivariable set of equations that may be solved to yield values of $B_1$–$B_m$. Other optimization algorithms exist and any optimization algorithm may be used to determine a best estimate of $B_1$–$B_m$.

Using the estimates of $A_1$–$A_n$ and $B_1$–$B_m$ and the algorithms described above, the remainder of the burst data transmission is then processed. The resulting signal is the best estimate of the transmit signals $S_{tr}$. This embodiment of process step 84 of FIG. 4 employs temporal channel correction and spatial filtering in order to correct the channel and optimize SINR in the resulting waveform.

Another embodiment of process step 84 of FIG. 4 is realized with sequential temporal-spatial filtering. The first step of this embodiment is to develop an accurate estimate of the channel employed to transmit the desired signal. The correlation approach described above is a preferred approach in estimating the channel.

The channel is estimated on a plurality of the antenna elements. In general, estimating the channel on a single element is not a good approach because in the presence of fading (destructive interference between reflected signals causing an overall attenuation of the received signal) can cause the received signal at a single antenna element to be substantially attenuated. Rather, the channel estimate should be based on a number of antenna elements (e.g. three) and the results combined to further reduce the effects of improper estimation of the interference due to random spatial effects.

Upon determining the relative positions of the delay paths, for each delay path, a spatial filter is created to locate energy associated with that specific delay path and eliminate uncorrelated energy. The spatial filter involves beamforming using the various antenna element inputs. In particular, a beamforming algorithm generates estimates for $B_1$–$B_m$ wherein the following formula generates the best estimate of the known, desired preamble at the specific delay path:

$$D = B_1 R_1 + B_2 R_2 + \ldots + B_m R_m$$

in which D=desired signal, $B_1$–$B_m$=complex coefficients that factor each equalized antenna input in order to form the beam, and $R_1$–$R_m$=signals received from each of m antennas.

One optimization approach is the method of least square error that was described above with relation to the method embodiment of temporal filtering that is followed by spatial filtering. In contrast to that method embodiment, an estimate is generated in this embodiment for each of the delay paths identified by the correlation function.

For each of the delay paths, using the estimates of $A_1$–$A_n$ and $B_1$–$B_m$ and the algorithms described above, the remainder of the burst data transmission is processed. This results in a number of signals, each corresponding to one delay path. These signals are combined after a variable delay, corresponding to the relative position of the delay paths. In other words, the variable delay lines up the waveform from each signal so that they add in phase, in a correlated manner.

Another embodiment of process step 84 of FIG. 4 is realized with simultaneous temporal and spatial filtering. In this embodiment, a temporal-spatial filter is created to estimate the appropriate channel. Upon determining the relative positions of the delay paths, for each delay path, a spatial filter is created to locate energy associated with that specific delay path and eliminate uncorrelated energy. The spatial filter involves beamforming and equalization using time delayed versions of the various antenna element inputs, as follows.

$$D = A_{(1,1)} R_1 z^{-1} + A_{(2,1)} R_1 z^{-2} \ldots A_{(n,1)} R_1 z^{-n} + A_{(1,2)} R_2 z^{-1} + A_{(2,2)} R_2 z^{-2} \ldots A_{(n,2)} R_2 z^{-n} + \ldots A_{(1,m)} R_m z^{-2} + \ldots A_{(n,m)} R_m z^{-n}$$

in which D=desired preamble signal, $R_1$–$R_m$=received signals from antenna elements 1–m, $A_{(1,1)}$–$A_{(n,m)}$=complex coefficients representing the space-time equalizer, and $z^{-n}$=delay element where n represents the number of delay states.

The space-time filter coefficients are optimized to find the best representation of the known preamble D. The preferred optimization method is the method of least squares estimation, whereby a cost function, defined as the square of the error between the estimated received preamble and the actual known preamble, is developed.

This error is then summed over the entire preamble and is minimized through differential calculus based on generating partial derivatives with respect to each of the coefficients $A_{(1,1)}$–$A_{(n,m)}$. This process yields a multivariable set of equations that may be solved to yield values of the complex coefficients. Other optimization algorithms exist and any optimization algorithm may be used to determine a best estimate of the filter coefficients.

Using the estimates of $A_{(1,1)}$–$A_{(n,m)}$ and the space-time filter algorithm described above, the remainder of the burst data transmission is then processed. The resulting signal is the best estimate of the transmitted signal. This technique employs simultaneous spatial and temporal channel correction to identify relationships between the two degrees of freedom and thus correct the channel and optimize SINR in the resulting waveform.

Another embodiment of process step 84 of FIG. 4 is realized with time dependent spatial filtering. The invention preferably uses a coherent phase reference to downconvert the signals from all the antenna elements (22 in FIG. 2) and synchronously digitizes the downconverted signals so that the correlation results are coherent across all elements.

The outputs of other process embodiments (e.g., temporal filtering followed by spatial filtering) are used to determine the timing and the relative phase of the echoes. Weights corresponding to the complex conjugate of these outputs are applied to the remainder of the burst data received at each antenna element in the form of an FIR filter. Then, this filtered output is summed with the corresponding filtered outputs from all the other elements. This results in multiple antenna beams that point to the apparent sources of the multipath signal, with time delays that correspond to those of each individual echo, and will constructively combine to reproduce the transmitted waveform.

The flow chart 80 of FIG. 4 also includes a step 86 of reducing interference signals in the combined corrected signal $S_{crct_{cmb}}$. An embodiment of process step 86 is performed after the filters described above have been used to correct the receive channel $C_{rcv}$. The SINR of the resulting signal is then significantly greater than it was at the individual antenna element where the data was first collected. Consequently, the element data better reflects the raw interference environment. One element is chosen as an interference reference, and its output is tested for the presence of interference. This test may comprise different algorithms, based on the method chosen for channel correction.

For example, if channel correction comprises temporal filtering that is followed by spatial filtering, then the interference may be measured by comparing the equalized channel spectrum with the expected spectrum of the preamble or the resulting space-time filtered signal. If the two spectra differ by more than a pre-determined amount, the presence of interference is assumed. The output of the equalized reference element(s) is then phase shifted, gain adjusted and added to the space-time filtered signal so as to minimize the energy of their sum. In the presence of interference, this process results in minimizing the interference.

If channel correction comprises sequential temporal-spatial filtering, then the spectrum of the resulting preamble from each delay path spatial filter may be compared with the spectrum from the resulting signal from the overall space-time filter to identify the dominant sources of interference. The output of the dominant sources of interference are phase shifted, gain adjusted and added to the space-time filtered signal so as to minimize the energy of their sum. This process results in minimizing interference.

Alternatively, the statistics of the spectrum of the space-time filtered signal may be compared with expected values. For those spectral peaks where the statistics exceed a pre-determined threshold, an equal and opposite waveform is generated to cancel the interference to the level of the desired statistic value.

The overall result of these processes is a piecewise constructed waveform that utilizes the full aperture of the antenna to receive, channel estimate and correct, and cancel interference in line-of-sight and non-line-of-sight signal reception.

Methods of the invention have been described for spatial-temporal filtering in reception of single carrier PSK/QAM signals with a known preamble. In addition, these methods can also be used with direct sequence spread spectrum (DSSS) signals—in particular, code division multiple assignment (CDMA). In DSSS signals the desired data is spread by a wideband code that effectively spreads the spectrum of the data prior to transmission. Upon reception of the transmitted signals, the receiver uses the same code to correlate the data. This has the effect of concentrating energy in the desired data and spreading energy in interference from undesired signals. CDMA concerns multiple spreading codes that are orthogonal to one another and the assignment of these codes to multiple receivers.

DSSS is inherently resilient to multipath delays because delayed versions of a signal are inherently decorrelated due to the properties of the spreading code. Rake receivers, for example, identify multiple delayed versions of a signal using delayed versions of the same spreading code and add the components of their respective despreading process. They thereby receive and utilize energy in delayed paths to increase SINR when equalizing the receive channel. This process can be augmented with the spatial temporal processing of the invention to further increase SINR.

A method embodiment for temporal filtering and subsequent spatial filtering has been described above. When this embodiment is applied to DSSS waveforms, an estimate of the numerous delayed paths is created by correlating with the desired spreading code, instead of the preamble as in the case of single carrier PSK or QAM signal. This estimate is used to optimize the delays used in a rake receiver to properly equalize the channel. The outputs of the equalized antenna inputs are then processed by a spatial filter of the invention, in which the coefficients are optimized (based on minimizing least squares error) over a plurality of data bits that are each spread by a spreading code. In waveforms that utilize a relatively wideband spreading code (compared with the data bandwidth), it is possible to optimize the spatial filter on a single data bit. Moreover, with DSSS waveforms, it is recommended that the spatial filter is continuously optimized since the spreading code is always present.

A method embodiment for sequential temporal-spatial filtering has been described above and this embodiment can be used with DSSS waveforms. As with the single carrier PSK/QAM waveforms, this method provides increased SINR due to the fact that the full aperture is used to increase SINR for each delayed path (rather than all delayed paths simultaneously). As described in the previous example, the estimation of delay paths and optimization of spatial filter coefficients per delay path are performed on a plurality of data bits (e.g., each data bit) based on the relative bandwidth of the spreading code to the data. Additionally, since the spreading code is always present, the spatial filter coefficients may be continuously optimized to account for time varying channels.

A method embodiment for simultaneous temporal-spatial filtering has been described above. This embodiment may also be applied to DSSS waveforms in which the spatial temporal filter coefficients are optimized based on the correlation of numerous delayed paths of the spreading code to the received waveform. As with the prior embodiments, this embodiment can be performed on a plurality of data bits (down to one bit) and may be continuously optimized to manage dynamic channels.

Figure 6:
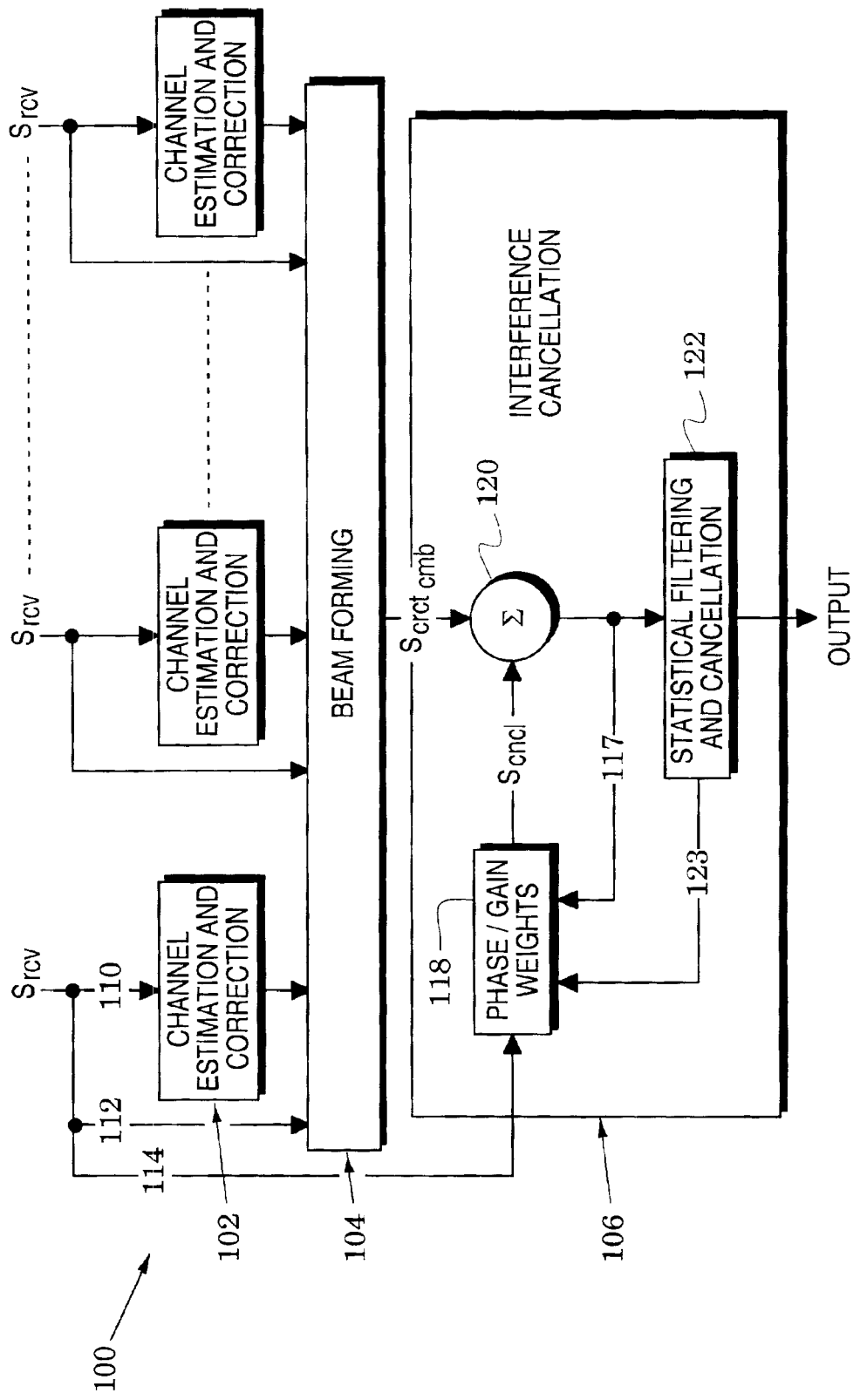
FIG. 6 is a diagram that illustrates various process combinations in other methods that can be practiced with the receiver system of FIG. 1.

The diagram 100 of FIG. 6 illustrates exemplary processes 102, 104 and 106 and coupling paths 110, 112 and 114 that couple receive signals $S_{rcv}$ to the processes so as to facilitate the various methods of the invention. Process 102 is directed to temporal filtering and includes channel estimation and correction (and associated correlation processes), process 104 is directed to spatial filtering and includes beam forming, and process 106 is directed to interference cancellation.

The receive signals $S_{rcv}$ can be provided along paths 110 and 112 so that temporal filtering can be performed prior to, subsequent to or simultaneously with spatial filtering to produce combined corrected signal $S_{crct_{cmb}}$ with enhanced SINR. Path 114 provides samples of the receive signals $S_{rcv}$ to the interference cancellation process 106 in which they can be compared to the corrected signals $S_{crct}$ to facilitate detection of interference signals in the combined corrected signal $S_{crct_{cmb}}$.

Substantial difference between a known signal parameter signal and a corresponding signal parameter of the corrected signals $S_{crct}$ indicates the presence of interference signals which are then canceled by applying phase and/or gain weights in process 118 to samples of the corrected signals $S_{crct}$ (provided over path 117) and/or the receive signals $S_{rcv}$ to form a cancellation signal $S_{cncl}$ which is combined with the corrected signals $S_{crct}$ in a summer 120. Alternatively or additionally, the spectrum of the corrected signals $S_{crct}$ is compared with expected values in a statistical filtering and cancellation process 122. If the difference exceeds a predetermined threshold, cancellation signals may be generated via path 123 and the process 118.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A method of processing transmit signals $S_{tr}$ that are received over a receive channel $C_{rcv}$ which is formed by a plurality of receive paths, the method comprising the steps of:
   receiving said transmit signals $S_{tr}$ with a plurality of spatially separated antennas to form respective receive signals $S_{rcv}$; and
   spatially and temporally processing said receive signals $S_{rcv}$ to form a combined corrected signal $S_{crctcmb}$ that reduces errors in at least one signal parameter;
   wherein said processing step includes the step of correcting said received signals $S_{rcv}$ to form respective corrected signals $S_{crct}$ that reduce errors in said signal parameter and further including the steps of:
   comparing said signal parameter of at least one of said corrected signals $S_{crct}$ to a known corresponding signal parameter to detect a difference; and
   altering phase and gain of said corrected signal $S_{crct}$ to reduce said difference below a predetermined threshold and thereby reduce the contribution of an interference signal to said combined corrected signal $S_{crctcmb}$.

2. The method of claim 1, further including the step of selecting said signal parameter from parameters that include signal preamble, signal code, spreading code and signal modulation.

3. A method of processing transmit signals $S_{tr}$ that are received over a receive channel $C_{rcv}$ which is formed by a plurality of receive paths, the method comprising the steps of:
   receiving said transmit signals $S_{tr}$ with a plurality of spatially separated antennas to form respective receive signals $S_{rcv}$; and
   spatially and temporally processing said receive signals $S_{rcv}$ to form a combined corrected signal $S_{crctcmb}$ that reduces errors in at least one signal parameter;
   wherein said processing step includes the step of correcting said received signals $S_{rcv}$ to form respective corrected signals $S_{crct}$ that reduce errors in said signal parameter and further including the steps of:
   comparing said signal parameter of at least one of said corrected signals $S_{crct}$ to a known corresponding signal parameter to detect a difference; and
   inserting a canceling signal into said corrected signals $S_{crct}$ to reduce said difference below a predetermined threshold and thereby reduce the contribution of an interference signal to said combined corrected signal $S_{crctcmb}$.

4. The method of claim 3, further including the step of selecting said signal parameter from parameters that include signal preamble, signal code, spreading code and signal modulation.

5. A method of processing transmit signals $S_{tr}$ that are received over a receive channel $C_{rcv}$ which is formed by a plurality of receive paths, the method comprising the steps of:
   receiving said transmit signals $S_{tr}$ with a plurality of spatially separated antennas to form respective received signals $S_{rcv}$; and
   spatially and temporally processing said receive signals $S_{rcv}$ to form a combined corrected signal $S_{crctcmb}$ that reduces errors in at least one signal parameter;
   wherein said processing step includes the steps of:
   correcting said receive signals $S_{rcv}$ to form respective corrected signals Scrct that reduce temporal errors in said signal parameter; and
   combining said corrected signals $S_{crct}$ to reduce spatial errors of said signal parameter in said combined corrected signal $S_{crctcmb}$.

6. The method of claim 5, wherein said correcting step includes the step of equalizing said receive channel $C_{rcv}$.

7. The method of claim 6, wherein, for each of said receive signals $S_{rcv}$, said equalizing step includes the steps of:
   summing versions of that received signal $S_{rcvd}$ that are modified with respective weights and time delays to form a corrected signal $S_{crct}$;
   comparing said signal parameter of said corrected signal $S_{crct}$ and a known corresponding signal parameter to detect a difference; and
   updating said weights and time delays to reduce said difference.

8. The method of claim 7, wherein said equalizing step further includes the step of convolving one of said receive signals $S_{rcv}$ with a known version of said signal parameter to determine said time delays.

9. The method of claim 5, wherein said combining step includes the steps of:
   providing said corrected signals $S_{crct}$ with respective weights to form said combined corrected signal $S_{crctcmb}$;
   comparing said signal parameter of said combined corrected signal $S_{crctcmb}$ and a known corresponding signal parameter to detect a difference; and
   updating said weights to reduce said difference.

10. The method of claim 5, wherein said combining step includes the steps of:
    comparing a spectrum of at least one of said corrected signals $S_{crct}$ to a spectrum of a known corresponding signal parameter to detect a difference; and
    altering phase and gain of said corrected signals $S_{crct}$ to reduce said difference below a predetermined threshold and thereby reduce the contribution of an interference signal to said combined corrected signal $S_{crctcmb}$.

11. The method of claim 5, further including the step of selecting said signal parameter from parameters that include signal preamble, signal code, spreading code and signal modulation.

12. A method of processing transmit signals $S_{tr}$ that are received over a receive channel $C_{rcv}$ which is formed by a plurality of receive paths, the method comprising the steps of:
    receiving said transmit signals $S_{tr}$ with a plurality of spatially separated antennas to form respective receive signals $S_{rcv}$; and
    spatially and temporally processing said receive signals $S_{rcv}$ to form a combined corrected signal $S_{crctcmb}$ that reduces errors in at least one signal parameter;
    wherein said processing step includes the steps of:
    estimating said receive channel $C_{rcv}$ to determine time delays that correspond to said receive paths;
    for each determined time delay, summing corresponding receive signals $S_{rcv}$ which are modified by respective weights to provide a respective corrected signal $S_{crct}$ that reduces spatial errors in said signal parameter; and
    with their respective time delays, combining all corrected signals $S_{crct}$ derived in said summing step to realize said combined corrected signal Scrctcmb.

13. The method of claim 17, further including the step of combining the results of said estimating step on at least two of said receive signals $S_{rcv}$.

14. The method of claim 12, wherein said estimating step includes the step of convolving one said receive signals $S_{rcv}$ with a known signal parameter that corresponds to said signal parameter of receive signals $S_{rcv}$ to determine delays.

15. The method of claim 12, wherein said estimating step includes the steps of:
summing versions of one of said receive signal $S_{rcv}$ that have respective weights and time delays to form a test signal $S_{tst}$;
comparing said signal parameter of said test signal $S_{tst}$ and a known corresponding signal parameter to detect a difference; and
updating said weights and time delays to reduce said difference.

16. The method of claim 12, further including the step of selecting said signal parameter from parameters that include signal preamble, signal code, spreading code and signal modulation.

17. A method of processing transmit signals $S_{tr}$ that are received over a receive channel $C_{rcv}$ which is formed by a plurality of receive paths, the method comprising the steps of:
receiving said transmit signals $S_{tr}$ with a plurality of spatially separated antennas to form respective receive signals $S_{rcv}$; and
spatially and temporally processing said receive signals $S_{rcv}$ to form a combined corrected signal $S_{crctcmb}$ that reduces errors in at least one signal parameter;
wherein said processing step includes the steps of:
for each of said receive signals $S_{rcv}$, providing signal versions of that receive signal $S_{rcv}$ that have respective weights and time delays;
summing said signal versions of all of said received signals $S_{rcv}$ to form said combined corrected signal $S_{crctcmb}$;
comparing said signal parameter of said combined corrected signal $S_{crctcmb}$ and a known corresponding signal parameter to detect a difference; and
updating said weights and time delays to reduce said difference.

18. The method of claim 17, wherein said comparing step includes the step of convolving one of said receive signals $S_{rcv}$ with a known version of said signal parameter to determine said time delays.

19. The method of claim 18, wherein said weights are complex coefficients.

20. The method of claim 17, further including the step of selecting said signal parameter from parameters that include signal preamble, signal code, spreading code and signal modulation.

21. A method of processing transmit signals $S_{tr}$ that are received over a receive channel $C_{rcv}$ which is formed by a plurality of receive paths, the method comprising the steps of:
receiving said transmit signals $S_{tr}$ with a plurality of spatially separated antennas to form respective receive signals $S_{rcv}$; and
spatially and temporally processing said receive signals $S_{rcv}$ to form a combined corrected signal $S_{crctcmb}$ that reduces errors in at least one signal parameter;
estimating said receive channel $C_{rcv}$ to determine time delays and respective weights for reduction of temporal errors in said signal parameter;
applying complex corrections based on of said weights to said signal portions to obtain corrected signals $S_{crct}$; and
summing said corrected signals $S_{crct}$ to obtain said combined corrected signal $S_{crctcmb}$.

22. The method of claim 21, further including the step of selecting said signal parameter from parameters that include signal preamble, signal code, spreading code and signal modulation.

23. A receiver system for processing transmit signals $S_{tr}$ that are received over a receive channel $C_{rcv}$ which is formed by a plurality of receive paths, the system comprising:
a plurality of spatially separated antennas that convert said transmit signals $S_{tr}$ to receive signals $S_{rcv}$;
a downconverter system that coherently downconverts said receive signals $S_{rcv}$;
analog-to-digital converters that coherently digitize said receive signals $S_{rcv}$; and
at least one data processor that is programmed to execute the step of spatially and temporally processing said receive signals $S_{rcv}$ to form a combined corrected signal $S_{crctcmb}$ that reduces errors in at least one signal parameter;
wherein said downconverter system includes:
downconverters that coherently downconvert and multiplex said receive signals $S_{rcv}$ to different first intermediate signals;
tuners that coherently downconvert said first intermediate signals to second intermediate signals; and
a cable that couples said first intermediate signals to said tuners.

24. A receiver system for processing transmit signals $S_{tr}$ that are received over a receive channel $C_{rcv}$ which is formed by a plurality of receive paths, the system comprising:
a plurality of spatially separated antennas that convert said transmit signals $S_{tr}$ to receive signals $S_{rcv}$;
a downconverter system that coherently downconverts said receive signals $S_{rcv}$;
analog-to-digital converters that coherently digitize said receive signals $S_{rcv}$; and
at least one data processor that is programmed to execute the step of spatially and temporally processing said receive signals $S_{rcv}$ to form a combined corrected signal $S_{crctcmb}$ that reduces errors in at least one signal parameter;
wherein said processing step includes the steps of:
correcting said receive signals $S_{rcv}$ to form respective corrected signals $S_{crct}$ that reduce temporal errors in said signal parameter; and
combining said corrected signals $S_{crct}$ to reduce spatial errors of said signal parameter in said combined corrected signal $S_{crctcmb}$.

25. The system of claim 24, wherein said processing step further includes the step of selecting said signal parameter from parameters that include signal preamble, signal code, reading code and signal modulation.

26. A receiver system for processing transmit signals $S_{tr}$ that are received over a receive channel $C_{rcv}$ which is formed by a plurality of receive paths, the system comprising:
a plurality of spatially separated antennas that convert said transmit signals $S_{tr}$ to receive signals $S_{rcv}$;
a downconverter system that coherently downconverts said receive signals $S_{rcv}$;
analog-to-digital converters that coherently digitize said receive signals $S_{rcv}$; and at least one data processor that is programmed to execute the step of spatially and temporally processing said receive signals $S_{rcv}$ to form a combined corrected signal $S_{crctcmb}$ that reduces errors in at least one signal parameter;

wherein said processing step includes the steps of:

estimating said receive channel $C_{rcv}$ to determine time delays that correspond to said receive paths;

for each determined time delay, summing corresponding received signals $S_{rcv}$ which are modified by respective weights to provide a respective corrected signal $S_{crct}$ that reduces spatial errors in said signal parameter; and with their respective time delays, combining all corrected signals $S_{crct}$ derived in said summing step to realize said combined corrected signal $S_{crctcmb}$.

27. The system of claim 26, wherein said processing step further includes the step of selecting said signal parameter from parameters that include signal preamble, signal code, spreading code and signal modulation.

28. A receiver system for processing transmit signals $S_{tr}$ that are received over a receive channel $C_{rcv}$ which is formed by a plurality of receive paths, the system comprising:

a plurality of spatially separated antennas that convert said transmit signals $S_{tr}$ to receive signals $S_{rcv}$;

a downconverter system that coherently downconverts said receive signals $S_{rcv}$;

analog-to-digital converters that coherently digitize said receive signals $S_{rcv}$; and at least one data processor that is programmed to execute the step of spatially and temporally processing said receive signals $S_{rcv}$ to form a combined corrected signal $S_{crctcmb}$ that reduces errors in at least one signal parameter;

wherein said processing step includes the steps of:

for each of said receive signals $S_{rcv}$, providing signal versions of that receive signals $S_{rcv}$ that have respective weights and time delays;

summing said signal versions of all of said receive signals $S_{rcv}$ to form said combined corrected signal $S_{crctcmb}$;

comparing said signal parameter of said combined corrected signal $S_{crctcmb}$ and a known corresponding signal parameter to detect a difference; and updating said weights and time delays to reduce said difference.

29. The system of claim 28, wherein said processing step further includes the step of selecting said signal parameter from parameters that include signal preamble, signal code, spreading code and signal modulation.

30. A receiver system for processing transmit signals $S_{tr}$ that are received over a receive channel $C_{rcv}$ which is formed by a plurality of receive paths, the system comprising:

a plurality of spatially separated antennas that convert said transmit signals $S_{tr}$ to receive signals $S_{rcv}$;

a downconverter system that coherently downconverts said receive signals $S_{rcv}$;

analog-to-digital converters that coherently digitize said receive signals $S_{rcv}$; and at least one data processor that is programmed to execute the step of spatially and temporally processing said receive signals $S_{rcv}$ to form a combined corrected signal $S_{crctcmb}$ that reduces errors in at least one signal parameter;

wherein said processing step includes the steps of:

estimating said receive channel $C_{rcv}$ to determine time delays and respective weights for reduction of temporal errors in said signal parameter;

applying complex conjugates of said weights to said signal portions to obtain corrected signals $S_{crct}$; and summing said corrected signals $S_{crct}$ to obtain said combined corrected signal $S_{crctcmb}$.

31. The system of claim 30, wherein said processing step further includes the step of selecting said signal parameter from parameters that include signal preamble, signal code, spreading code and signal modulation.

* * * * *

UNITED STATES PATENT AND TRADEMARK OFFICE
CERTIFICATE OF CORRECTION

PATENT NO. : 6,947,507 B2  Page 1 of 1
DATED : September 20, 2005
INVENTOR(S) : Kris Kelkar and Anand Kelkar It is certified that error appears in the above-identified patent and that said Letters Patent is hereby corrected as shown below:

Column 2,
Line 67, "received" should be changed to -- receive --.

Column 11,
Lines 43 and 64, "received" should be changed to -- receive --.

Column 13,
Line 7, in the phrase "...to determine delays", insert -- to determine said time delays --.
Line 10, "signal" should be changed to -- signals --.
Line 37, "received" should be changed to -- receive --.

Column 15,
Line 11, "received" should be changed to -- receive --.

Signed and Sealed this

Thirteenth Day of December, 2005

JON W. DUDAS
*Director of the United States Patent and Trademark Office*